United States Patent
Michiels et al.

(10) Patent No.: US 9,602,273 B2
(45) Date of Patent: Mar. 21, 2017

(54) IMPLEMENTING KEY SCHEDULING FOR WHITE-BOX DES IMPLEMENTATION

(71) Applicant: NXP B.V., Eindhoven (NL)

(72) Inventors: Wil Michiels, Eindhoven (NL); Jan Hoogerbrugge, Eindhoven (NL)

(73) Assignee: NXP B.V., Austin, TX (US)

( * ) Notice: Subject to any disclaimer, the term of this patent is extended or adjusted under 35 U.S.C. 154(b) by 0 days.

(21) Appl. No.: 14/705,635

(22) Filed: May 6, 2015

(65) Prior Publication Data

US 2016/0330019 A1    Nov. 10, 2016

(51) Int. Cl.
*H04K 1/00* (2006.01)
*H04L 9/06* (2006.01)
*H04L 9/14* (2006.01)

(52) U.S. Cl.
CPC .............. *H04L 9/0631* (2013.01); *H04L 9/14* (2013.01); *H04L 2209/24* (2013.01)

(58) Field of Classification Search
CPC . H04L 9/06; H04L 9/08; H04L 9/0618; H04L 9/0631; G06F 21/72
USPC ....... 380/28, 29, 44, 277, 278; 713/189, 190
See application file for complete search history.

(56) References Cited

U.S. PATENT DOCUMENTS

| | | | |
|---|---|---|---|
| 5,511,123 A * | 4/1996 | Adams | H04L 9/002 380/29 |
| 7,043,016 B2 * | 5/2006 | Roelse | H04L 9/0625 380/28 |
| 7,099,470 B2 * | 8/2006 | Lim | H04L 9/0625 380/29 |
| 7,366,300 B2 * | 4/2008 | Qi | H04L 9/0625 380/255 |
| 8,102,997 B2 * | 1/2012 | Teglia | H04L 9/003 380/29 |
| 2007/0014394 A1 | 1/2007 | Harder et al. | |

(Continued)

FOREIGN PATENT DOCUMENTS

WO    2010102960 A1    9/2010

OTHER PUBLICATIONS

Synchrosoft MCFACT—Secure Data Processing Technology, Re-Trust Sixth Quarterly Meeting, Mar. 11, 2008, Villach, Austria, 108 pages.

(Continued)

*Primary Examiner* — Hosuk Song

(57) ABSTRACT

A device and method for performing a keyed cryptographic operation mapping an input message to an output message including a first and a second round, wherein the cryptographic operation includes a key scheduling method that produces round keys based upon the encryption key, including: instructions for receiving a first input by the first round; instructions for receiving a second input by the first round; instructions for outputting the second input as a third input to the second round; instructions for performing a first cryptographic operation on the second input using a first static round key to produce a first cryptographic output; and instructions for combining first input, the first cryptographic output, and a second encoded dynamic round key to produce a fourth input to the second round, wherein the second encoded dynamic round key is produced by inputting an encoded dynamic encryption key into the key scheduling method.

21 Claims, 5 Drawing Sheets

(56) References Cited

U.S. PATENT DOCUMENTS

2015/0381351 A1* 12/2015 Kuenemund ......... H04L 9/0618
 713/189
2016/0127123 A1* 5/2016 Johnson .................. H04L 9/003
 713/189

OTHER PUBLICATIONS

Billet, et al., "Cryptanalysis of a White Box AES Implementation", Selected Areas in Cryptography, vol. 3357 of Lecture Notes in Computer Science,, 227-240.
Chow, et al., "A White-Box DES Implementation for DRM Applications", Proceedings of the 2nd ACM Workshop on Digital Rights Management, 1-15, 2002.
Chow, et al., "White-Box Cryptography and an AES implementation", Cryptography: 9th Annual International Workshop, SAC 2002, St. John's, Newfoundland, Canada, Aug. 15, 2002.
Michiels, "Opportunity in white-box cryptography.", IEEE Security & Privacy, 8(1), 64-67, 2010.

* cited by examiner

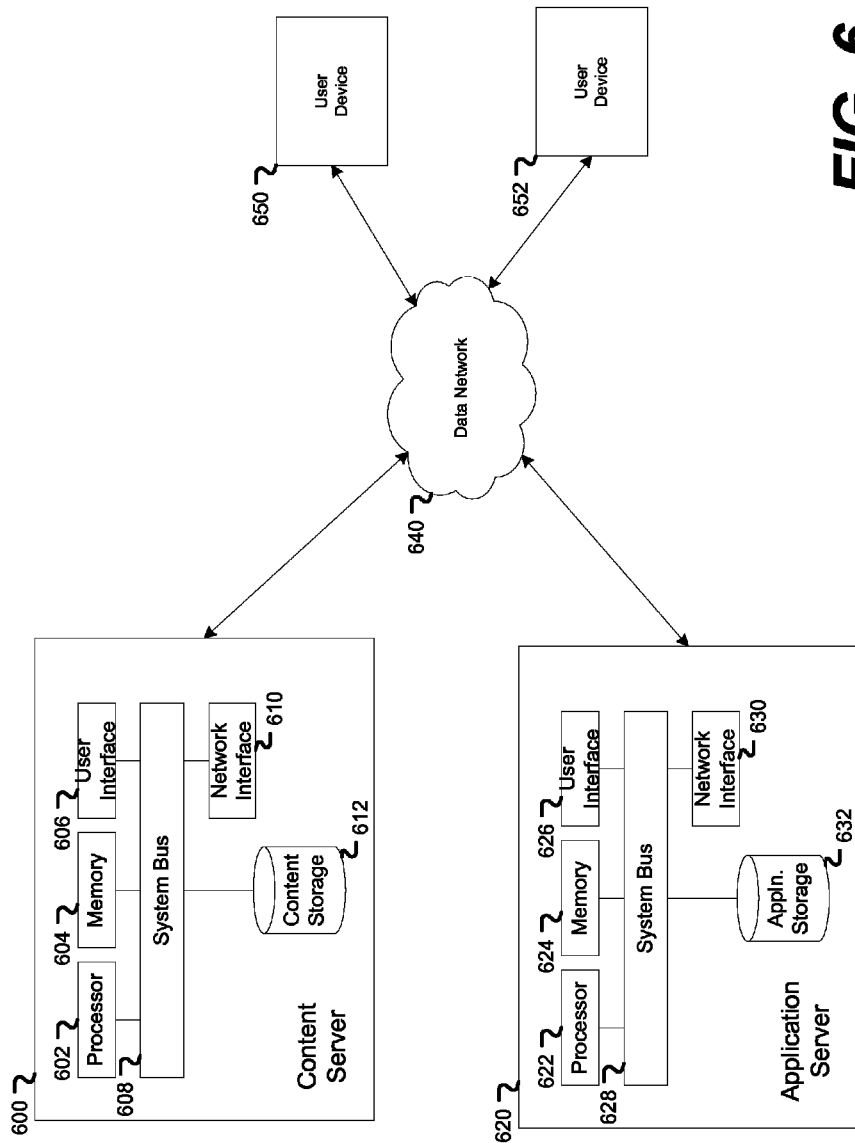

IMPLEMENTING KEY SCHEDULING FOR WHITE-BOX DES IMPLEMENTATION

TECHNICAL FIELD

Various exemplary embodiments disclosed herein relate generally to securing software components that perform a cryptographic function against attacks including implementing padding in a white-box implementation.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a non-transitory machine-readable storage medium encoded with instructions for execution by a keyed cryptographic operation by a cryptographic system mapping an input message to an output message including a first and a second round, wherein the cryptographic operation includes a key scheduling method that produces round keys based upon the encryption key, including: instructions for receiving a first input by the first round; instructions for receiving a second input by the first round; instructions for outputting the second input as a third input to the second round; instructions for performing a first cryptographic operation on the second input using a first static round key to produce a first cryptographic output; and instructions for combining first input, the first cryptographic output, and a second encoded dynamic round key to produce a fourth input to the second round, wherein the second encoded dynamic round key is produced by inputting an encoded dynamic encryption key into the key scheduling method.

Further various exemplary embodiments relate to a device for performing a keyed cryptographic operation mapping an input message to an output message including a first and a second round, wherein the cryptographic operation includes a key scheduling method that produces round keys based upon the encryption key, including: a memory; and a processor in communication with the memory, the processor being configured to: receive a first input by the first round; receive a second input by the first round; output the second input as a third input to the second round; perform a first cryptographic operation on the second input using a first static round key to produce a first cryptographic output; and combine first input, the first cryptographic output, and a second encoded dynamic round key to produce a fourth input to the second round, wherein the second encoded dynamic round key is produced by inputting an encoded dynamic encryption key into the key scheduling method.

Further various exemplary embodiments relate to a method for performing a keyed cryptographic operation by a cryptographic system mapping an input message to an output message including a first and a second round, wherein the cryptographic operation includes a key scheduling method that produces round keys based upon the encryption key, including: receiving a first input by the first round; receiving a second input by the first round; outputting the second input as a third input to the second round; performing a first cryptographic operation on the second input using a first static round key to produce a first cryptographic output; and combining first input, the first cryptographic output, and a second encoded dynamic round key to produce a fourth input to the second round, wherein the second encoded dynamic round key is produced by inputting an encoded dynamic encryption key into the key scheduling method.

BRIEF DESCRIPTION OF THE DRAWINGS

In order to better understand various exemplary embodiments, reference is made to the accompanying drawings, wherein:

FIG. 6 illustrates a system for providing a user device secure content and a software application that processes the secure content.

To facilitate understanding, identical reference numerals have been used to designate elements having substantially the same or similar structure and/or substantially the same or similar function.

DETAILED DESCRIPTION

Figure 1:
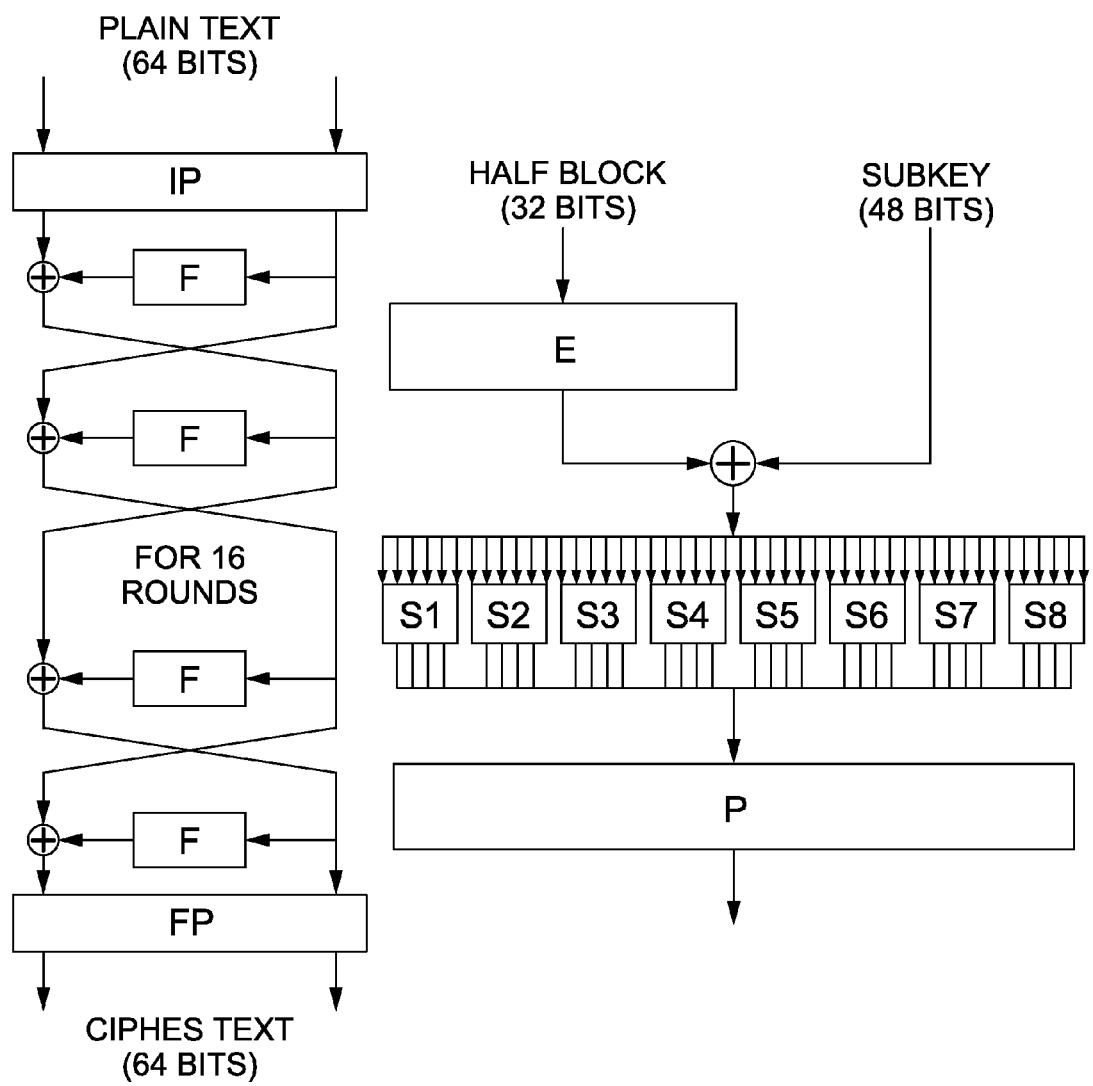
FIG. 1 illustrates the DES cipher.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACS. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number of input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

The white-box implementations described by Chow have a fixed key. That is, changing the key implies that the white-box implementation (or at least a part of it) has to be replaced. Although this may be acceptable if the rate at which keys are replaced is very low, it is less desirable in applications where there are frequent key updates. Moreover, if there is an application requiring many keys to be alive at the same time, it may not be desirable to have a separate white-box implementation for each key.

U.S. Pat. No. 8,625,794 to Michiels describes a possible approach for efficiently changing keys in a white-box implementation. In Michiels, the AES key is updated by encoding all of its round keys, which are next provided as input to the white-box implementation. Herein, embodiments are described that implement an efficient different approach that works for affine key-scheduling algorithms, like those used for example in DES/3DES.

Typically, white-box implementations work with static keys. That is, a fixed key is integrated in a white-box implementation. This means that replacing the key requires replacing (part of) the white-box implementation. If an application requires frequent key updates, then a more efficient method for replacing keys is needed. Herein, embodiments are described that implement an approach for white-box DES, where the standard key-scheduling algorithm may be used.

Let $WB(K_{static})$ be a white-box DES implementation with key $K_{static}$ integrated into it. Embodiments included herein describe a method for using the white-box implementation for any dynamic key $K_{dynamic}$. These embodiments include the following aspects:

DES is implemented by a white-box implementation $WB(K_{static})$ with key $K_{static}$ integrated into it;

key $K_{dynamic}$ is encoded by $Enc(K_{dynamic}) = K_{static} \oplus K_{dynamic}$;

the key scheduling algorithm A is implemented according to its standard specification, that is, on input κ it gives the DES round keys belonging to this key;

the key scheduling algorithm is applied to $κ = Enc(K_{dynamic})$ that produces the round keys $κ_1, κ_2, \ldots$;

the round keys $κ_1, κ_2, \ldots$ are provided as an input parameter to $WB(K_{static})$ to get the functionality of DES with key $K_{dynamic}$—hereby, using the property that the ith round key of $K_{dynamic}$ is given by the ith round key of $K_{static}$ XORed with the ith round key $κ_i$ of κ.

The above aspects are formulated in terms of DES. As described below, this may be formulated in more general terms.

Consider an arbitrary block cipher with the following format. It includes multiple rounds, where each round operates on n-bit data blocks by applying in some order the following operations: XORing with a round key, an S-box layer, and an affine transformation. Furthermore, suppose that there is a linear key scheduling algorithm, which means that the round keys are given by $κ_i = σ(κ) = L_i(κ)$ for linear mapping $L_i$. Then, the embodiments described herein include the following aspects:

the cipher is implemented by a white-box implementation with static round keys $K_{static,i} = L_i(K_{static})$;

Key $K_{dynamic}$ is encoded by $Enc(K_{dynamic}) = K_{static} \oplus K_{dynamic}$;

the key scheduling algorithm A is implemented according to its standard specification.

the key scheduling algorithm is applied to $κ = EnC(K_{dynamic})$ that produces the round keys $κ_1, κ_2, \ldots$;

the round keys $κ_1, κ_2, \ldots$ are provided as input parameter to $WB(K_{static})$ to get the functionality of the implemented cipher with key $K_{dynamic}$— hereby, using the property that the ith round key of $K_{dynamic}$ is given by the ith round key of $K_{static}$ XORed with the ith round key $κ_i$ of κ.

It is noted that a cipher with an affine key scheduling algorithm may be viewed as an algorithm with a linear key scheduling algorithm by adding the constant addition to the S-box operation and/or the affine diffusion transformation. Tiny Encryption Algorithm is also as an example of another cipher with a linear key scheduling algorithm.

Chow presents white-box implementations for AES and DES. What these white-box implementations have in common is that they implement the cipher by means of an obfuscated table network. As these white-box implementations are rather complicated to discuss, a simpler implementation will be used to explain the embodiments described herein. However, this simpler white-box implementation still has the essential properties of Chow's white-box implementation being that all operations are written as obfuscated lookup tables and that all intermediate results are encoded. Below, this simplified white-box DES implementation is discussed.

FIG. 1 illustrates the DES cipher. Encryption and decryption only differ from each other in the order of the round keys. The DES cipher 100 includes 16 rounds. Before the first round there is an initial permutation (IP) 110, and after the last round there is a final permutation (FP) 140. The 64-bit input of a round in divided into two 32-bit halves 102, 104. The right half becomes the left half of the next round. In addition, a round function (F) 120 is applied to the right half and the result is XORed 130 with the left half. This produces the right half of the next round. Such a structure is called a Feistel scheme. This round structure is repeated for 16 rounds.

The right-hand side of FIG. 1 depicts the round function (F) 120 of DES. First, its 32-bit input is expanded to 48 bits by copying 16 of its bits (the outer 2 bits of the nibbles) by the expansion operator (E) 122. The expanded 48 bits of output are XORed 124 with round subkey. This results in eight 6-bit values that are input into 8 different S-boxes (S1-S8) 126. Each of the S-boxes in the set of S-boxes (S1-S8) 126 are the same for different rounds. Each S-box maps its 6-bit input to a 4 bit output. The 32-bit output of the round function is finally obtained by applying a fixed 32-bit permutation (P) 128 on the output of the S-boxes.

Now a description of a white-box DES implementation is provided. To focus on the essentials, the description is restricted to rounds r=3, 4, . . . , 14. Rounds 1, 2, 15, and 16 are slightly different because of the (possible) availability of plain cipher input and output.

Figure 2:
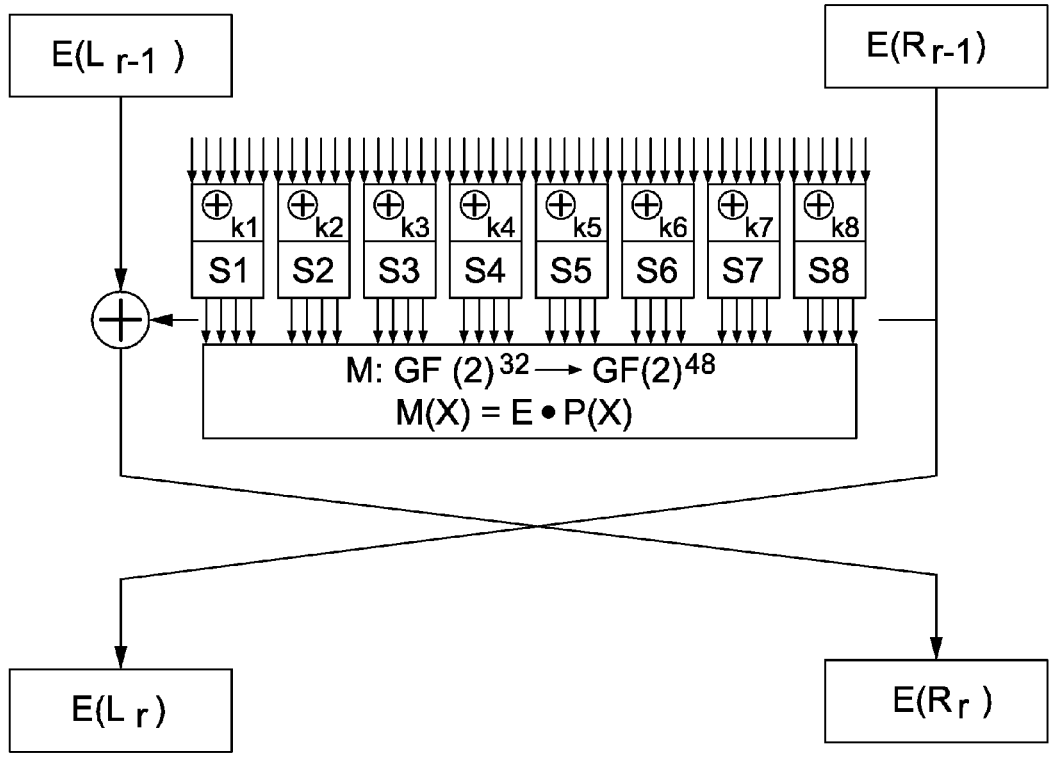
FIG. 2 illustrates an alternative formulation of DES.

First an alternative formulation 200 of DES is determined as illustrated in FIG. 2. Instead of a 64-bit data block split into a 32-bit left half 210 and a 32-bit right half 215, the intermediate values become the values to which the expansion operator E is applied. This implies that, instead of applying the expansion operator E to the input of the S-boxes of round r, the expansion operator E is applied to the output of the round function in the previous round r−1 resulting in $E(L_{r-1})$ and $E(R_{r-1})$. That is, the expansion operator E is applied after the permutation operation (P) in the previous round r−1. By merging the permutation operation (P) and expansion operation E into a multiplication $(M(x)=E \circ P(x))$ with a single matrix M and by integrating the key-addition operation 220 in the S-box operation 225, the formulation depicted in FIG. 2 results. Based on this formulation, a white-box implementation will be derived.

The derivation of the white-box implementation includes two steps. In the first step, the implementation is written as a network of lookup tables. In the second step, the obtained network of lookup tables are obfuscated.

Writing DES as Network of Lookup Tables

Figure 3:
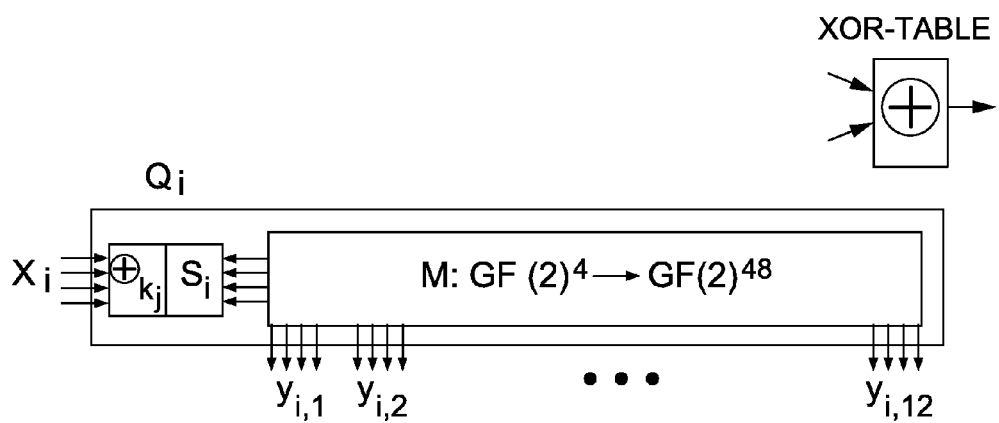
FIG. 3 illustrates a white-box implementation of the round function and XOR function of the DES cipher using only lookup tables.

First, the matrix M is partitioned into 8 stripes of 4 columns, that is, $M_i$ with i=1, 2, . . . , 8 is defined as a 48 by 4 matrix, such that $M=(M_1 M_2 \ldots M_8)$. In order to simplify the notation, $M_i$ is also as the linear mapping associated with the matrix multiplication with $M_i$. Then, the 48-bit output of the round function is given by $y = \oplus_{j=1}^{8} M_i \circ S_i(x_i)$. If an 6-to-48-bit lookup table $Q_i$ 310 is defined for each function such that $Q_i: y_i = M_i \circ S_i(x_i)$, and if a lookup table for the XOR of two nibbles is defined, the computation of the round-function output y may be written as a network of lookup tables where the output y is calculated as $y = \bigoplus_{j=1}^{8} M_i \circ S_i(x_i)$. Furthermore, by using XOR-lookup tables 320, the Feistel structure may be implemented by only using lookup tables. FIG. 3 illustrates a white-box implementation of the round function and XOR function of the DES cipher using only lookup tables. To implement a round of the DES cipher, eight Q-tables $Q_1 \ldots Q_8$ would be needed with a number of XOR-lookup tables 320 to combine the outputs of the eight Q-tables.

Obfuscating Network of Lookup Tables

Figure 4:
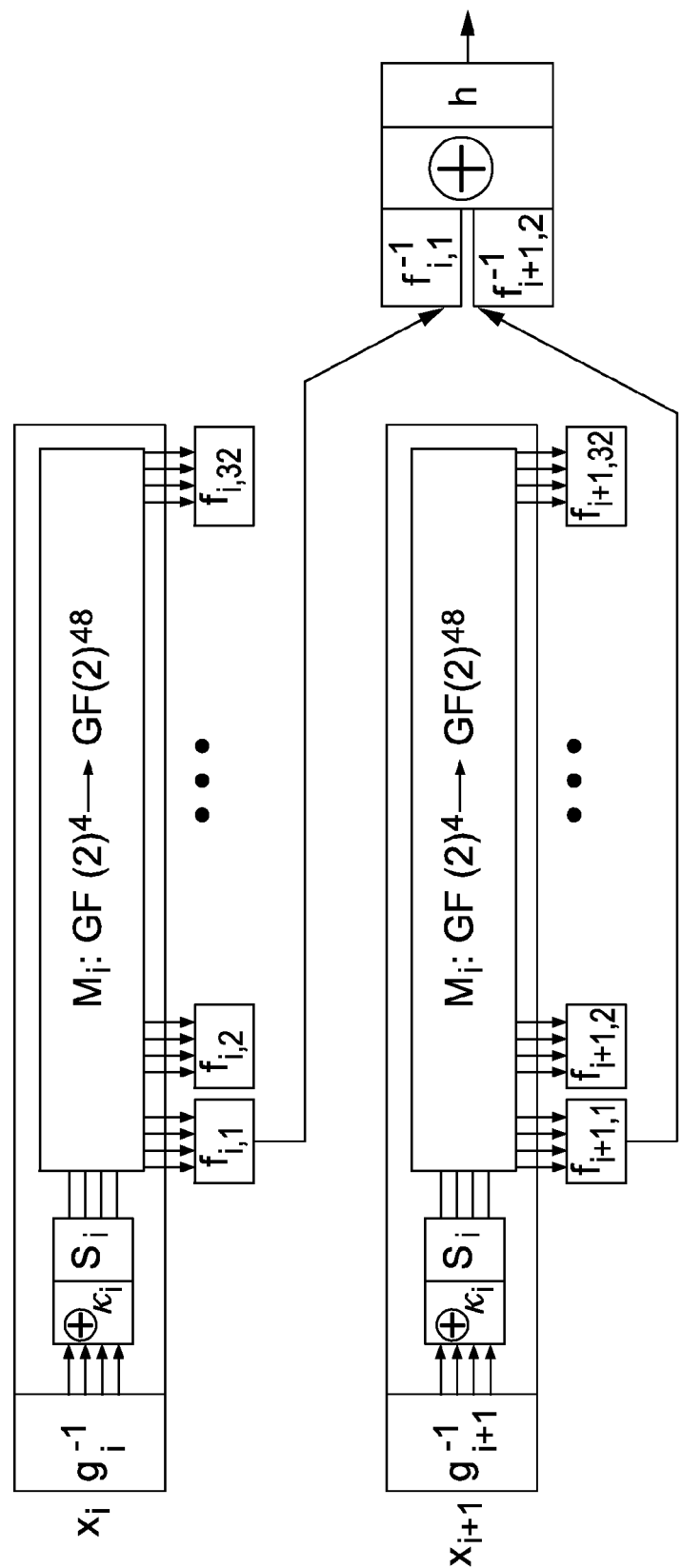
FIG. 4 illustrates the obfuscation of the white-box implementation of FIG. 3.

In the implementation described in FIG. 3, the key may easily be extracted from the Q-tables. Just applying the inverse of the expansion operation (E), permutation operation (P), and S-box operation to the output gives the plain key-addition operation. To prevent this, the input and outputs of all lookup tables may be encoded with arbitrary bijective functions. This means that a lookup table is merged with an encoding function that encodes the output and merged with a decoding function that decodes the input. The encodings are chosen such that the output encoding of one table matches the input encoding assumed in the next tables. FIG. 4 illustrates the obfuscation of the white-box implementation of FIG. 3. More specifically, FIG. 4 illustrates decoding the obfuscated the input of the Q-table using a function $g_i^{-1}$ and obfuscating the twelve outputs of the Q-table using the functions $f_{i,1} \ldots f_{i,12}$. Further the inputs of an XOR-table 420 that succeeds the Q-table a decoded using the appropriate inverse $f_{i,j}^{-1}$. The output of the XOR-table 420 is then encoded using the function h. In this example two Q-tables 410, 412 are illustrated and the first nibble of their outputs are combined by the XOR-table 420. This structure can be expanded to implement the complete round functions. Note that in the white-box implementation obtained, both the lookup tables and the intermediate values are obfuscated.

Above, it was stated that the embodiments described herein using the DES cipher include the following aspects:
DES is implemented by a white-box implementation $WB(K_{static})$ with key $K_{static}$ integrated into it;
key $K_{dynamic}$ is encoded by $Enc(K_{dynamic}) = K_{static} \oplus K_{dynamic}$;
the key scheduling algorithm A is implemented according to its standard specification, that is, on input Kit gives the DES round keys belonging to this key;
the key scheduling algorithm is applied to $\kappa = Enc(K_{dynamic})$ that produces the round keys $\kappa_1, \kappa_2, \ldots$;
the round keys $\kappa_1, \kappa_2, \ldots$ are provided as an input parameter to $WB(K_{static})$ to get the functionality of DES with key $K_{dynamic}$— hereby, using the property that the ith round key of $K_{dynamic}$ is given by the ith round key of $K_{static}$ XORed with the ith round key $\kappa_i$ of $\kappa$.

Above, a white-box DES implementation using a static key $K_{static}$ was described. To implement the feature described above, it will now be shown how to extend the white-box implementation with additional input parameters that are used for the round keys $\kappa_1, \kappa_2, \ldots$ of key $\kappa = Ent(K_{dynamic})$. This extension is illustrated by showing how to change the description of FIG. 2. Similarly as described above with respect to FIGS. 3 and 4, this extended description may be transformed into an obfuscated table network. In order to clearly describe the implementation of this extension, the focus is on a round r not being one of the first two or last two rounds.

Figure 5:
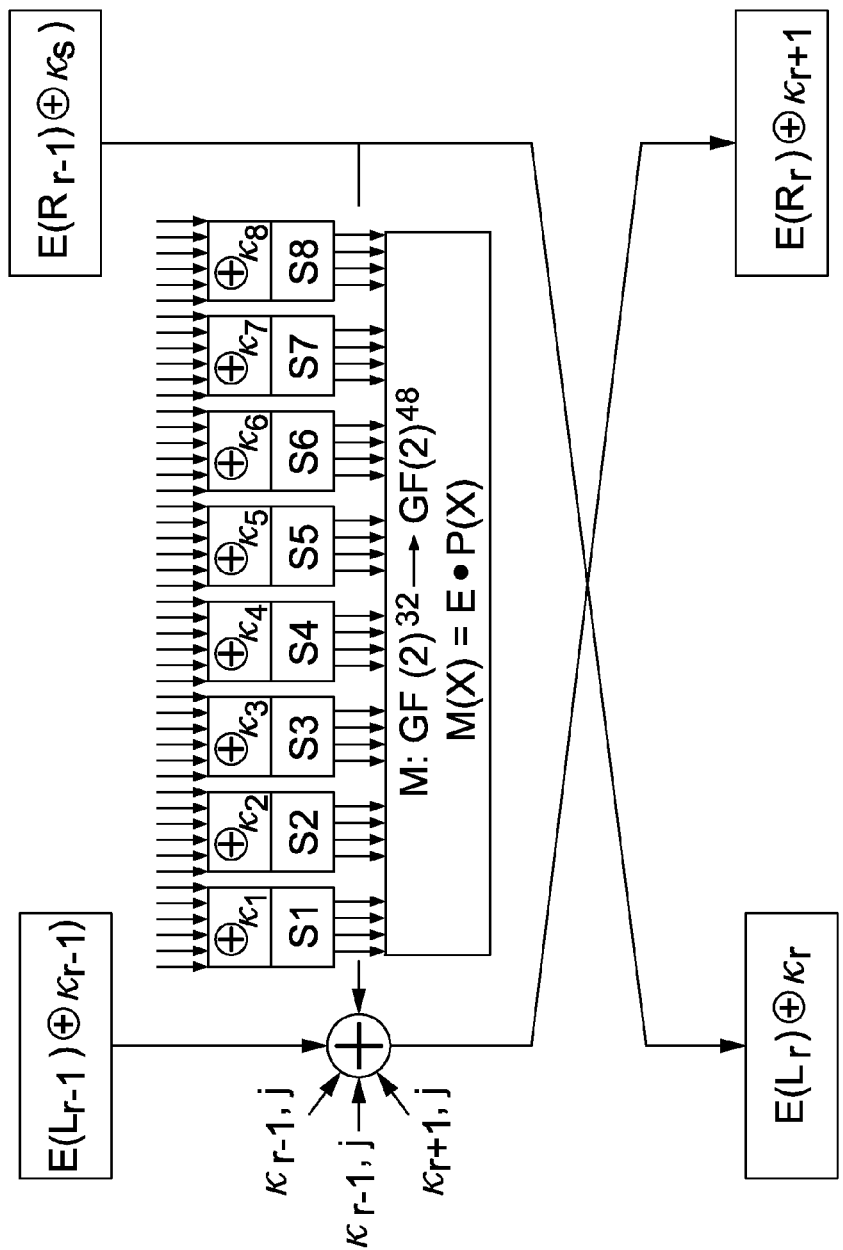
FIG. 5 illustrates an extension of the DES implementation of FIG. 2 to implement the use of dynamic cryptographic keys.

FIG. 5 illustrates an extension of the DES implementation of FIG. 2 to implement the use of dynamic cryptographic keys. In FIG. 2, the output of a round r is given by the 48-bit data blocks $E(L_r)$ 210 and $E(R_r)$ 215. In FIG. 5, these two inputs are replaced by $E(L_r) \oplus \kappa_r$ 510 and $E(R_r) \oplus \kappa_{r+1}$ 515. This may be realized by extending the Feistel XOR 535, such that the intermediate result of round r is also XORed with the values $\kappa_{r-1}$ and $\kappa_{r+i}$. The result of this change is that the input to the S-box layer in round r is given by $E(R_{r-1}) \oplus \kappa_r$ plus the round key of the static key glued to the S-box layer. This means that the input is given by $E(R_{r-1}) \oplus \kappa_r \oplus K_{static,r}$. Because $\kappa = Ent(K_{dynamic}) = K_{static} \oplus K_{dynamic}$, the input equals $E(R_{r-1}) \oplus K_{dynamic,r}$. Hence, the white-box implementation gets the functionality associated with dynamic key $K_{dynamic}$ as proposed.

Above, a method for obfuscating a table network was described. This method works for encoding intermediate results. It does, however, not apply to the input of a first lookup table unless an input of the implementation is allowed to have a non-linear nibble encoding applied to it. For embodiments described herein, this means that the XOR-table with a nibble of $\kappa_r$ as input parameter, does not get an input decoding integrated for this nibble. It can, however, have one for the other input nibble and for the output nibble.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

FIG. 6 illustrates a system for providing a user device secure content and a software application that processes the secure content. The system includes a content server 600, application server 680, user devices 650, 652, and a data network 640. The user devices 650, 652 may request access to secure content provided by the content server 600 via data network 640. The data network can be any data network providing connectivity between the user devices 650, 652 and the content server 600 and application server 680. The user devices 650, 652 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 600. The software application may be downloaded from the application server 680. The software application may be obscured using the techniques described above as well as operate as described above. Once the user devices 650, 652 install the software application, the user device may then download secure content from the content server 600 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 600 may control the access to the secure content provided to the user devices 650, 652. As a result when the content server 600 receives a request for secure content, the content server 600 may transmit the secure content to the requesting user device. Likewise, the application server 620 may control access to the software application provided to the user devices 650, 652. As a result when the content server 620 receives a request for the software application, the application server 620 may transmit the software application to the requesting user device. A user device requesting the software application or secure content may also be authenticated by the respective servers, before providing the software application or secure content to the user device.

The content server 600 may include a processor 602, memory 604, user interface 606, network interface 610, and content storage 612 interconnected via one or more system buses 680. It will be understood that FIG. 6 constitutes, in some respects, an abstraction and that the actual organization of the components of the device 600 may be more complex than illustrated.

The processor 602 may be any hardware device capable of executing instructions stored in memory 604 or storage 612. As such, the processor may include a microprocessor, field programmable gate array (FPGA), application-specific integrated circuit (ASIC), or other similar devices.

The memory 604 may include various memories such as, for example L1, L2, or L3 cache or system memory. As such, the memory 602 may include static random access memory (SRAM), dynamic RAM (DRAM), flash memory, read only memory (ROM), or other similar memory devices.

The user interface 606 may include one or more devices for enabling communication with a user such as an administrator. For example, the user interface 606 may include a display, a mouse, and a keyboard for receiving user commands.

The network interface 610 may include one or more devices for enabling communication with other hardware devices. For example, the network interface 610 may include a network interface card (NIC) configured to communicate according to the Ethernet protocol. Additionally, the network interface 610 may implement a TCP/IP stack for communication according to the TCP/IP protocols. Various alternative or additional hardware or configurations for the network interface 610 will be apparent.

The content storage 612 may include one or more machine-readable content storage media such as read-only memory (ROM), random-access memory (RAM), magnetic disk storage media, optical storage media, flash-memory devices, or similar storage media. In various embodiments, the content storage 612 may store content to be provided to users.

The application server 620 includes elements like those in the content server 600 and the description of the like elements in the content server 600 apply to the application server 620. Also, the content storage 612 is replaced by application storage 632. Further, it is noted that the content server and applications server may be implemented on a single server. Also, such servers may be implemented on distributed computer systems as well as on cloud computer systems.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a keyed cryptographic operation by a cryptographic system mapping an input message to an output message including a first and a second round, wherein the cryptographic operation includes a key scheduling method that produces round keys based upon the encryption key, comprising:
   instructions for receiving a first input by the first round;
   instructions for receiving a second input by the first round;

instructions for outputting the second input as a third input to the second round;
instructions for performing a first cryptographic operation on the second input using a first static round key to produce a first cryptographic output;
instructions for combining the first input, the first cryptographic output, and a second encoded dynamic round key to produce a fourth input to the second round, wherein the second encoded dynamic round key is produced by inputting an encoded dynamic encryption key into the key scheduling method;
instructions for receiving the third input by the second round;
instructions for receiving a fourth input by the second round;
instructions for outputting the fourth input as a fifth input to a third round;
instructions for performing a second cryptographic operation on the fourth input using a second static round key to produce a second cryptographic output; and
instructions for combining the third input, the second cryptographic output, and a third encoded dynamic round key to produce a sixth input to the third round, wherein the third encoded dynamic round key is produced by inputting an encoded dynamic encryption key into the key scheduling method.

2. The non-transitory machine-readable storage medium of claim 1, wherein instructions for performing a cryptographic operation on the second input using a first static round key to produce a cryptographic output further comprise:
instructions for applying a substitution operation to the expanded second input; and
instructions for applying a permutation operation and expansion operation to the output of the substitution operation.

3. The non-transitory machine-readable storage medium of claim 1, wherein lookup tables implement the keyed cryptographic operation.

4. The non-transitory machine-readable storage medium of claim 1, wherein the keyed cryptographic operation is the data encryption standard.

5. The non-transitory machine-readable storage medium of claim 1, wherein finite state machines implement the keyed cryptographic operation.

6. The non-transitory machine-readable storage medium of claim 1, wherein the second encoded dynamic round key is the XOR of the second dynamic round key and the second round static key.

7. The non-transitory machine-readable storage medium of claim 1, wherein instructions for combining first input, the first cryptographic output, and a second encoded dynamic round key further include combining first input, the first cryptographic output, a second encoded dynamic key, and a previous encoded dynamic round key associated with a previous round.

8. A device for performing a keyed cryptographic operation mapping an input message to an output message including a first and a second round, wherein the cryptographic operation includes a key scheduling method that produces round keys based upon the encryption key, comprising:
a memory; and
a processor in communication with the memory, the processor being configured to:
receive a first input by the first round;
receive a second input by the first round;
output the second input as a third input to the second round;
perform a first cryptographic operation on the second input using a first static round key to produce a first cryptographic output;
combine the first input, the first cryptographic output, and a second encoded dynamic round key to produce a fourth input to the second round, wherein the second encoded dynamic round key is produced by inputting an encoded dynamic encryption key into the key scheduling method;
receive the third input by the second round;
receive a fourth input by the second round;
output the fourth input as a fifth input to a third round;
perform a second cryptographic operation on the fourth input using a second static round key to produce a second cryptographic output; and
combine third input, the second cryptographic output, and a third encoded dynamic round key to produce a sixth input to the third round, wherein the third encoded dynamic round key is produced by inputting an encoded dynamic encryption key into the key scheduling method.

9. The device of claim 8, wherein performing a cryptographic operation on the second input using a first static round key to produce a cryptographic output further comprises:
applying a substitution operation to the expanded second input; and
applying a permutation operation and expansion operation to the output of the substitution operation.

10. The device of claim 8, wherein lookup tables implement the keyed cryptographic operation.

11. The device of claim 8, wherein the keyed cryptographic operation is the data encryption standard.

12. The device of claim 8, wherein finite state machines implement the keyed cryptographic operation.

13. The device of claim 8, wherein the second encoded dynamic round key is the XOR of the second dynamic round key and the second round static key.

14. The device of claim 8, wherein combining first input, the first cryptographic output, and a second encoded dynamic round key further includes combining first input, the first cryptographic output, a second encoded dynamic key, and a previous encoded dynamic round key associated with a previous round.

15. A method for performing a keyed cryptographic operation by a cryptographic system on a processor mapping an input message to an output message including a first and a second round, wherein the cryptographic operation includes a key scheduling method that produces round keys based upon the encryption key, comprising:
receiving a first input by the first round;
receiving a second input by the first round;
outputting the second input as a third input to the second round;
performing a first cryptographic operation on the second input using a first static round key to produce a first cryptographic output;
combining the first input, the first cryptographic output, and a second encoded dynamic round key to produce a fourth input to the second round, wherein the second encoded dynamic round key is produced by inputting an encoded dynamic encryption key into the key scheduling method;
receiving the third input by the second round;
receiving a fourth input by the second round;

outputting the fourth input as a fifth input to a third round;

performing a second cryptographic operation on the fourth input using a second static round key to produce a second cryptographic output; and combining the third input, the second cryptographic output, and a third encoded dynamic round key to produce a sixth input to the third round, wherein the third encoded dynamic round key is produced by inputting an encoded dynamic encryption key into the key scheduling method.

16. The method of claim 15, wherein performing a cryptographic operation on the second input using a first static round key to produce a cryptographic output further comprises:

applying a substitution operation to the expanded second input; and applying a permutation operation and expansion operation to the output of the substitution operation.

17. The method of claim 15, wherein lookup tables implement the keyed cryptographic operation.

18. The method of claim 15, wherein the keyed cryptographic operation is the data encryption standard.

19. The method of claim 15, wherein finite state machines implement the keyed cryptographic operation.

20. The method of claim 15, wherein the second encoded dynamic round key is the XOR of the second dynamic round key and the second round static key.

21. The method of claim 15, wherein instructions for combining first input, the first cryptographic output, and a second encoded dynamic round key further include combining first input, the first cryptographic output, a second encoded dynamic key, and a previous encoded dynamic round key associated with a previous round.

* * * * *